US012809551B2

(12) United States Patent
Lee

(10) Patent No.: US 12,809,551 B2
(45) Date of Patent: Nov. 24, 2026

(54) METHOD FOR ADJUSTING WORKING STATE OF MEMORY DEVICE, AND RELATED MEMORY DEVICE, ELECTRONIC DEVICE AND CONTROLLER

(71) Applicant: Silicon Motion, Inc., Jhubei City (TW)

(72) Inventor: Cheng Yu Lee, Zhubei City (TW)

(73) Assignee: Silicon Motion, Inc., Jhubei City (TW)

( * ) Notice: Subject to any disclaimer, the term of this patent is extended or adjusted under 35 U.S.C. 154(b) by 0 days.

(21) Appl. No.: 18/762,682

(22) Filed: Jul. 3, 2024

(65) Prior Publication Data

US 2025/0013390 A1 Jan. 9, 2025

(30) Foreign Application Priority Data

Jul. 4, 2023 (TW) ................................ 112124920

(51) Int. Cl.
*G06F 3/06* (2006.01)

(52) U.S. Cl.
CPC .......... *G06F 3/0659* (2013.01); *G06F 3/0604* (2013.01); *G06F 3/0679* (2013.01)

(58) Field of Classification Search
CPC .... G06F 3/0659; G06F 3/0604; G06F 3/0679; G06F 3/061; G06F 3/0625; G06F 3/0629; G06F 3/0634; G06F 3/0655; G06F 3/0658
See application file for complete search history.

(56) References Cited

U.S. PATENT DOCUMENTS

| | | | | |
|---|---|---|---|---|
| 2015/0023101 | A1* | 1/2015 | Tanaka | G06F 1/3275 365/185.11 |
| 2017/0177061 | A1* | 6/2017 | Kumar | G06F 3/0625 |
| 2020/0233474 | A1* | 7/2020 | Alcorn | G06F 1/28 |
| 2020/0409602 | A1 | 12/2020 | Lee | |
| 2021/0090641 | A1 | 3/2021 | Strand et al. | |
| 2021/0200698 | A1 | 7/2021 | Tanpairoj et al. | |
| 2021/0373648 | A1 | 12/2021 | Nam et al. | |
| 2021/0382649 | A1* | 12/2021 | Muthiah | G06F 3/0659 |
| 2022/0350535 | A1* | 11/2022 | Song | G06F 1/3275 |
| 2022/0397953 | A1* | 12/2022 | Wang | G06F 1/3225 |

* cited by examiner

*Primary Examiner* — Tracy A Warren

(57) ABSTRACT

The present invention relates to a method for adjusting a working state of a memory device, and a related memory device, an electronic device and a memory controller. The method includes configuring the memory controller to perform the following steps: setting a waiting time before the memory device enters a power-down mode as a first time value, where the memory device enters the power-down mode after the waiting time from being driven by a power-down instruction; determining whether the host device is performing an access operation; and setting the waiting time as a second time value in response to the host device being performing the access operation, where the first time value is smaller than the second time value.

16 Claims, 3 Drawing Sheets

METHOD FOR ADJUSTING WORKING STATE OF MEMORY DEVICE, AND RELATED MEMORY DEVICE, ELECTRONIC DEVICE AND CONTROLLER

FIELD OF THE INVENTION

The present invention relates to the field of memory control, and more particularly to a method for adjusting a working state of a memory device, and a related memory device, an electronic device and a memory controller.

BACKGROUND OF THE INVENTION

A memory device can include a flash memory for storing data, and it is quite complicated to control the flash memory. For example, the memory device can be a memory card, a solid state drive (SSD), or an embedded memory device (for example, an embedded memory device conforming to standards of universal flash storage (UFS)).

In order to save power, a host (for example, a bottom layer of a host device) will automatically send a packet entering a power-down mode to notify the memory device of entering the power-down mode, and the memory device will enter the power-down mode after receiving the packet. After entering the power-down mode, the memory device takes a long time to process an instruction sent by the host, resulting in performance deterioration. In order to maintain the performance, in the prior art, the memory device waits for a predetermined time instead of immediately entering the power-down mode after receiving a power-down instruction (that is, the above-mentioned packet) from the host, so as to avoid experiencing wakeup time over frequently due to improper entry into the power-down mode. In addition, in the above method, the memory device waits for an additional predetermined time before entering the power-down mode, which is equivalent to that the memory device has to bear the extra power consumption caused by the delayed entry into the power-down mode.

Therefore, there is a real need for an innovative method and a related architecture to address the above problems.

SUMMARY OF THE INVENTION

From the above, an embodiment of the present invention lies in providing a method for adjusting a working state of a memory device, and a related memory device, an electronic device and a memory controller. When a power-down instruction is automatically sent at a bottom layer of a host, a determining condition is added into an original firmware through software to validate whether the host device is in an idle state or in a non-idle state, and then dynamically adjust the waiting time before the memory device enters the power-down mode, so that the power consumption can be reduced while an access speed of the memory device is maintained.

Another embodiment of the present invention further provides a method for adjusting a working state of a memory device, where the memory device is configured to be coupled to a host device and includes a memory controller and a non-volatile memory, and the memory controller is coupled to the non-volatile memory and configured to control an operation of the memory device; the method includes configuring the memory controller to perform the following steps: setting a waiting time before the memory device enters a power-down mode as a first time value, where the memory device enters the power-down mode after the waiting time from being driven by a power-down instruction; determining whether the host device is performing an access operation; and setting the waiting time as a second time value in response to the host device being performing the access operation, where the first time value is smaller than the second time value.

Another embodiment of the present invention provides a memory device, where the memory device includes a non-volatile memory and a memory controller. The non-volatile memory is configured to store information, and the memory controller is coupled to the non-volatile memory and configured to control an operation of the memory device, where the memory controller includes a processing circuit and a transmission interface circuit. The processing circuit is configured to control the memory controller according to a plurality of host instructions from a host device to allow the host device to access the non-volatile memory through the memory controller. The transmission interface circuit is configured to communicate with the host device to perform transmitting and receiving operations. The memory controller is configured to perform the following steps: setting a waiting time before the memory device enters a power-down mode as a first time value, where the memory device enters the power-down mode after the waiting time from being driven by a power-down instruction; determining whether the host device is performing an access operation; and setting the waiting time as a second time value in response to the host device being performing the access operation, where the first time value is smaller than the second time value.

Another embodiment of the present invention provides an electronic device, and the electronic device includes the memory device and the host device, where the host device is coupled to the memory device and includes: at least one processor, configured to control an operation of the host device; a power supply circuit, coupled to the at least one processor and configured to provide a power source to the at least one processor and the memory device, where the memory device provides storage space to the host device.

Another embodiment of the present invention provides a memory controller for a memory device, and the memory device includes the memory controller and a non-volatile memory; the memory controller includes: a processing circuit, configured to control the memory controller according to a plurality of host instructions from a host device to allow the host device to access the non-volatile memory through the memory controller; and a transmission interface circuit, configured to communicate with the host device; where the memory controller is configured to perform the following steps: setting a waiting time before the memory device enters a power-down mode as a first time value, where the memory device enters the power-down mode after the waiting time from being driven by a power-down instruction, the waiting time starts when the host device presents an idle state, and the first time value is smaller than the waiting time; determining whether the host device is performing an access operation; and setting the waiting time as a second time value in response to the host device being performing the access operation, where the first time value is smaller than the second time value.

Optionally, in an embodiment of the present invention, the first time value is greater than or equal to 0 ms.

Optionally, in an embodiment of the present invention, the second time value is greater than or equal to 20 ms.

Optionally, in an embodiment of the present invention, the determining whether the host device is performing an access operation includes: detecting whether a read instruction or a write instruction is received from the host device, where when the read instruction or the write instruction is detected and at least one of the following conditions is satisfied, determining that the host device is performing the access operation: if a volume of data read or written is greater than a first threshold after the read instruction or the write instruction is performed; and if a quantity of read instructions or write instructions continuously performed is greater than a second threshold after the read instruction or the write instruction is performed. Optionally, in an embodiment of the present invention, when three consecutive volumes of data in the read instruction or the write instruction are greater than the first threshold, it is determined that the host device is performing an access operation.

Optionally, in an embodiment of the present invention, the second threshold is at least two.

Optionally, in an embodiment of the present invention, the first threshold is greater than or equal to 512 Kb.

In summary, with change in conditions that the memory device enters the power-down mode, the present invention can accelerate the memory device to enter the power-down mode so as to reduce power consumption, and at the same time, in a case that the electronic device has a demand for the access operation, the memory device is allowed to enter the power-down mode after the waiting time based on a determining mechanism, and therefore the overall performance of the memory device will not be reduced.

DETAILED DESCRIPTION OF PREFERRED EMBODIMENTS

Figure 1:
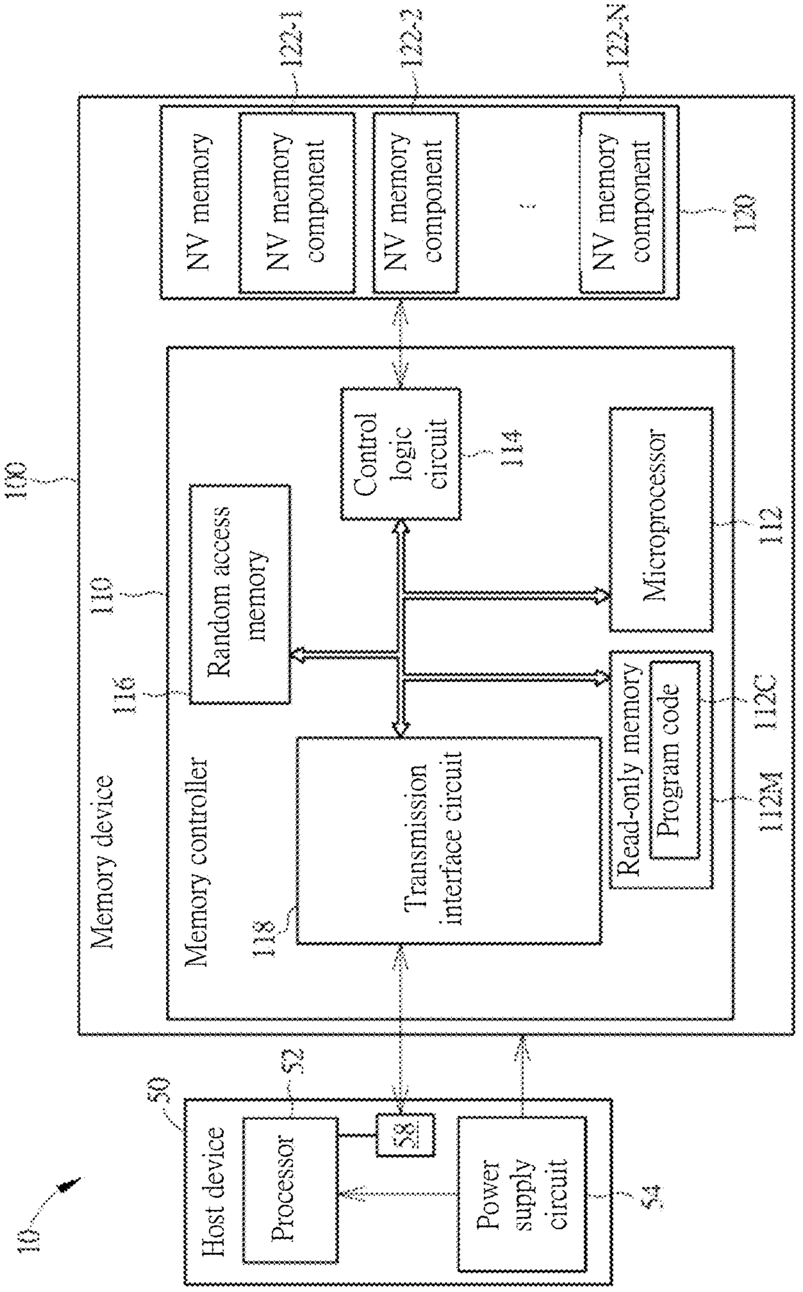
FIG. 1 is a schematic diagram of an electronic device according to an embodiment of the present invention.

The present invention will now be described more specifically with reference to the following embodiments. The embodiments are intended for purpose of illustration and description only, because various alterations and modifications can be made to those skilled in the art without departing from the spirit and scope of this disclosure. The protection scope of this disclosure should be subject to the application scope of the appended patent. Throughout the specification and the scope of the patent application, the meanings of "a" and "the" include that such statement includes "one or at least one" component or ingredient, unless contents are clearly specified. In addition, as used herein, singular article also includes the statement of plural components or ingredients, unless it is obvious from a specific context that plural is excluded. Moreover, unless contents are clearly specified in the description and all the following scopes of the patent application, the meaning of "therein" can include "therein" and "thereon". Unless otherwise specified, terms used in the specification and the scope of the patent application usually have the ordinary meanings of each term used in the field, in contents disclosed herein and in special contents. Some words intended to describe the present invention will be discussed below or elsewhere in the specification to provide additional guidance for a practitioner in terms of the description of the present invention. Examples anywhere in the specification, including examples of any words discussed herein, are intended for purpose of illustration and description only, and certainly do not limit the scope and significance of the present invention or any illustrative words. Similarly, the present invention is not limited to various embodiments set forth in the specification.

Words "substantially", "around", "about" or "approximately" used herein should generally mean within 20% of a given value or range, preferably within 10%. In addition, quantities provided herein can be approximate, meaning that the words "around", "about" or "approximately" can be used unless otherwise stated. When quantities, concentrations or other numerical values or parameters are specified in terms of range and preferred range or listed in terms of ideal upper and lower values, it should be deemed as a special disclosure of all ranges formed by any number pairs or ideal values of upper and lower limits, regardless of whether the ranges are disclosed separately. For example, if a specified length in the disclosed range is from X cm to Y cm, the disclosed length should be deemed as H cm and H can be any real number between X and Y.

In addition, the term "electrically coupled" or "electrically connected" includes any direct and indirect manners of electrical connection, if used herein. For example, as described herein, a first device being electrically coupled to a second device means that the first device can be directly connected to the second device or indirectly connected to the second device through other devices or connection manners. In addition, if the transmission and provision of electrical signals are described, persons skilled in the art should understand that attenuation or another non-ideal change may occur during the transmission of the electrical signals. Unless otherwise specified, the source of the transmission or provision of the electrical signals and the receiver of the electrical signals should be substantially deemed as a same signal. For example, if an electrical signal S is transmitted (or provided) by a terminal A of an electronic circuit to a terminal B thereof, a voltage drop may be caused through two terminals of a source electrode of a transistor switch and/or a potential stray capacitor. However, if the design is not to deliberately use the attenuation or another non-ideal change generated during the transmission (or provision) to achieve some specific technical effects, the electrical signal S should be substantially deemed as a same signal at the terminal A of the electronic circuit and the terminal B thereof.

It can be understood that terms "comprising", "including", "having", "containing", "involving" and the like used herein are open-ended, meaning including but not limited to. Moreover, it is not necessary for any embodiment of the present invention or the scope of the patent application to achieve all the purposes, advantages or features disclosed herein. In addition, abstract and title are only intended to assist the search of patent documents, instead of limiting the scope of the patent application of the present invention.

FIG. 1 is a schematic diagram of an electronic device 10 according to an embodiment of the present invention, where the electronic device 10 may include a host device 50 and a memory device 100. The host device 50 can include at least one processor (for example, one or more processors), which can be collectively referred to as a processor 52, a power supply circuit 54 and a transmission interface circuit 58. The processor 52 and the transmission interface circuit 58 can be coupled to each other through a bus and can be coupled to the power supply circuit 54 to obtain a power source. The processor 52 can be configured to control an operation of the host device 50, and the power supply circuit 54 can be configured to provide the power source to the processor 52, the power supply circuit 54 and the memory device 100, and output one or more driving voltages to the memory device 100, where the memory device 100 can provide storage space for the host device 50, and can obtain the one or more driving voltages from the host device 50 as a power source for the memory device 100. Examples of the host device 50 may include, but are not limited to, multi-functional mobile phones, tablet computers, wearable devices, and personal computers, such as desktop computers and notebook computers. Examples of the memory device 100 may include, but are not limited to, portable memory devices (such as memory cards and solid state drives (SSD) conforming to SD/MMC, CF, MS or XD standards) and different types of embedded memory devices (for example, embedded memory devices conforming to standards of universal flash storage (UFS) or standards of embedded multimedia cards (EMMC)). According to the embodiment, the memory device 100 may include a memory controller such as a memory controller 110, and may further include a non-volatile (NV) memory 120 (marked as "NV memory" in FIG. 1), where the memory controller is configured to access the non-volatile memory 120 and the non-volatile memory 120 is configured to store information. The non-volatile memory 120 may include at least one non-volatile memory component (for example, one or more non-volatile memory components), such as a plurality of non-volatile memory components 122-1, 122-2, . . . , and 122-N (respectively marked as "NV memory components" in FIG. 1), where "N" may represent a positive integer greater than 1. For example, the non-volatile memory 120 may be a flash memory. The plurality of non-volatile memory components 122-1, 122-2, . . . , and 122-N may be a plurality of flash memory chips or a plurality of flash memory dies respectively, but the present invention is not limited to this.

As shown in FIG. 1, the memory controller 110 may include a processing circuit (such as a microprocessor 112), a storage unit (for example, a read-only memory 112M, marked as "ROM"), a control logic circuit 114, a random access memory 116 (for example, the random access memory can be implemented by a static random access memory and marked as "RAM"), and a transmission interface circuit 118, where at least part (for example, a part or all) of the above components can be coupled to each other through a bus. The random access memory 116 can be configured to provide internal storage space (for example, information can be temporarily stored) for the memory controller 110, but the present invention is not limited to this. In addition, the read-only memory 112M of the embodiment is configured to store a program code 112C, and the microprocessor 112 is configured to execute the program code 112C to control the access of the non-volatile memory 120. It should be noted that the program code 112C can also be stored in the random access memory 116 or any type of the memory. In addition, the control logic circuit 114 can be configured to control the non-volatile memory 120. The control logic circuit 114 may include an error correction code (ECC) circuit (not shown in FIG. 1) which may encode and decode an error correction code to protect data and/or perform error correction. The transmission interface circuit 118 may conform to one or more of various communication standards (for example, standards of serial advanced technology attachment (SATA), standards of universal serial bus (USB), standards of peripheral component interconnect express (PCIE), standards of embedded multimedia card, and standards of universal flash storage) and enables the memory device 100 to communicate with the host device 50 (for example, the transmission interface circuit 58) according to the one or more of communication standards. Similarly, the transmission interface circuit 58 may conform to the one or more communication standards, and enables the host device 50 to communicate with the memory device 100 (for example, the transmission interface circuit 118) according to the one or more communication standards. The transmission interface circuit 58 can be considered to have a circuit architecture (for example, a plurality of corresponding sub-circuits) similar to or equivalent to that of the transmission interface circuit 118.

In the embodiment, the host device 50 can send a plurality of host instructions corresponding to logical addresses to the memory controller 110, so as to indirectly access the non-volatile memory 120 in the memory device 100. The memory controller 110 receives the plurality of host instructions and the logical addresses, respectively converts the plurality of host instructions into a memory operation instruction (which can be used as an operation instruction), and further controls the non-volatile memory 120 having the operation instruction to read or write/program a memory unit or a data page of a specific physical address in the non-volatile memory 120, where the physical address may be associated with the logical address. For example, the memory controller 110 may generate or update at least one logical-to-physical (L2P) address mapping table to manage a relationship between the physical address and the logical address.

In addition, the above-mentioned at least one non-volatile memory component (for example, one or more non-volatile memory components, such as {122-1, 122-2, . . . , 122-N}) may include a plurality of blocks, where a smallest unit of the memory controller 110 to perform a data erase operation on the non-volatile memory 120 may be a block, and a smallest unit of the memory controller 110 to perform a data write operation on the non-volatile memory 120 may be a page, but the present invention is not limited to this. For example, any one of the non-volatile memory components 122-1, 122-2, . . . , and 122-N (where "N" may represent any integer in an interval [1, N]) may include the plurality of blocks, and one of the plurality of blocks may include and record a specific quantity of pages, where the memory controller 110 may access a page in a block among the plurality of blocks according to a block address and a page address.

After the host device 50 sends the power-down instruction to the control logic circuit 114, the control logic circuit 114 can add a determining condition into an original firmware through software to determine whether the host device 50 is in an idle state or in a non-idle state, and then dynamically adjust the waiting time before the memory device 100 enters the power-down mode, so that the power consumption can be reduced while an access speed of the memory device 100 is maintained. The power-down mode may be a sleeping mode of the device, such as a low power consumption mode or a shutdown mode.

Figure 2:
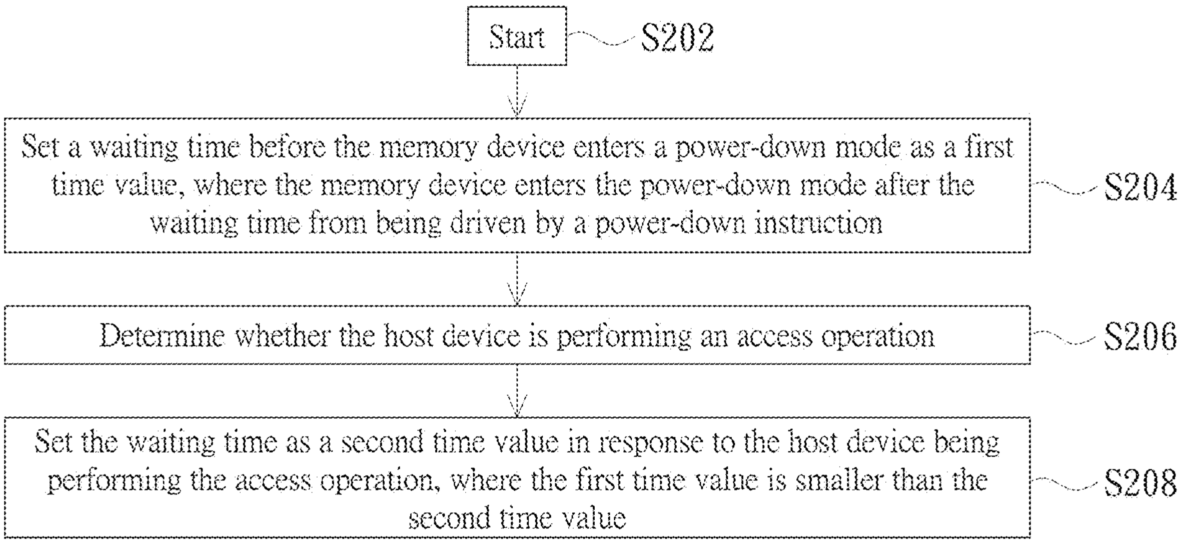
FIG. 2 is a flow diagram of a method for adjusting a working state of a memory device according to an embodiment of the present invention.

Refer to FIG. 2. FIG. 2 is a flow diagram of a method for adjusting a working state of a memory device according to an embodiment of the present invention. It should be noted that if substantially identical results can be obtained, these steps are not necessarily executed in an execution order shown in FIG. 2. The method as shown in FIG. 2 can be adopted by the electronic device 10, the host device 50 and/or the memory device 100, and the memory controller of the memory device is configured to perform the following steps:

Step S202: start;

Step S204: set a waiting time before the memory device enters a power-down mode as a first time value, where the memory device enters the power-down mode after the waiting time from being driven by a power-down instruction;

Step S206: determine whether the host device is performing an access operation; and Step S208: set the waiting time as a second time value in response to the host device being performing the access operation, where the first time value is smaller than the second time value.

Since persons skilled in the art can readily understand details of each of the steps in FIG. 2 after reading the above paragraphs, further description will be omitted herein for the sake of brevity.

Figure 3:
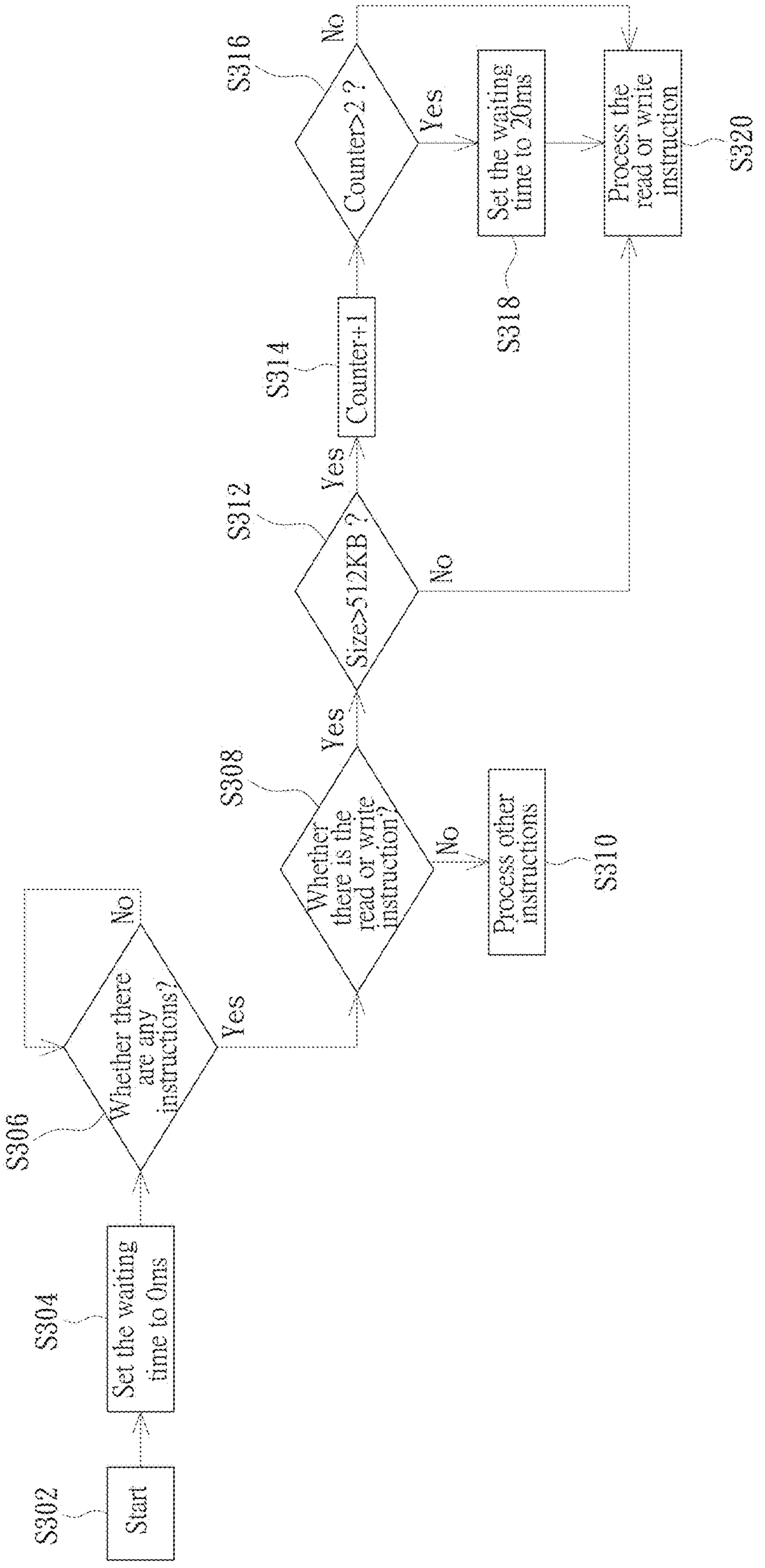
FIG. 3 is a block diagram of adjustment of a working state of a memory device by a memory controller according to the present invention.

Specifically, refer to FIG. 3. FIG. 3 is a block diagram of adjustment of a working state of a memory device 100 by a memory controller 110 according to the present invention. The block diagram in FIG. 3 may be deemed as an implementation detail of the method in FIG. 2. First, in Step S302 and Step S304, the memory controller 110 sets the waiting time that the memory device 100 enters the power-down mode as one first time value (for example, 0 ms, but the present invention is not limited to this), where the waiting time starts when the memory controller 110 receives the power-down instruction from the host device 50. The above-mentioned waiting time is set to prevent the memory device 100 from over frequently entering the power-down mode and being waken up. Therefore, a buffer time is needed to determine that the memory device 50 has no demand to access the memory device 100, the memory device 100 is allowed to enter the power-down mode then. In the embodiment, it is assumed that the host device 50 has no demand to access the memory device 100 at the beginning of a process, so the waiting time is set as the first time value (for example, 0 ms).

Then, the memory controller 110 detects whether there are any instructions from the host device 50 in Step S306. If the instructions from the host device 50 are detected, the memory controller 110 further determines whether these instructions include a read instruction or a write instruction in Step S308; if these instructions include the read instruction or the write instruction, Step S312 is proceeded; if these instructions do not include the read instruction or the write instruction, Step S310 is proceeded to process other types of instructions.

Then, in Step S312, in response to the read instruction or the write instruction from the host device 5, the memory controller 110 detects whether a volume of data to be read or written by the instruction is greater than a first threshold (for example, 512 Kb, but the present invention is not limited to this). If the volume of data to be read or written by the instruction is greater than the first threshold, Step S314 is proceeded, for example, a counter is given a count value plus one (marked as "Counter+1" in the figure), and the count value represents a quantity of read instructions or write instructions consecutively processed when the volume of data is greater than the first threshold; if the volume of data to be read or written by the instruction is not greater than the first threshold, Step S320 is proceeded to process the read instructions or the write instructions, but the waiting time is not modified. After Step S314, Step S316 is proceeded to determine whether a quantity of read instructions or write instructions consecutively processed when the volume of data is greater than the first threshold is greater than a second threshold (marked as "Counter>2" in the figure) if the read instructions or the write instructions are executed. In the embodiment, if at least three consecutive instructions are greater than the first threshold, the host device 50 is determined to still have a demand for the access operation, Step S318 is proceeded; if at least three consecutive instructions are not greater than the first threshold, Step S320 is proceeded to process the read instructions or the write instructions, but the first time value is not modified. It should be noted that in the embodiment, two read instructions or two write instructions whose volumes of data are greater than 512 KB being consecutively processed will be a benchmark to determine whether the host device 50 still has the demand for the access operation, but the benchmark can be replaced with other conditions according to actual design requirements. For example, 512 Kb in Step S312 can be set to another volume of data, and/or a volume of data used to determine a volume of data to be consecutively read and written in Step S316 can be changed from two to another value. Even Step S314 and Step S316 can be omitted, and when the execution result of Step S312 is "yes", Step S318 can be directly executed; and even Step S314 is omitted, Step S314 and Step S316 are executed after Step S308, or Step S318 is directly executed after Step S308.

In Step S318, the memory controller 110 sets the waiting time to a second time value. For example, the second time value may be 20 ms or other time values (but which should be greater than the first time value). Because it is determined that the host device 50 may still have the demand for the access operation, the memory device 100 is allowed to enter the power-down mode after the waiting time (for example, 20 ms) from the power-down instruction is received.

In summary, with change in conditions that the memory device enters the power-down mode, the present invention can accelerate the memory device to enter the power-down mode so as to reduce power consumption, and at the same time, in a case that the electronic device has a demand for the access operation, the memory device is allowed to enter the power-down mode based on a determining mechanism after the waiting time, and therefore the overall performance of the memory device will not be reduced.

What is claimed is:

1. A method for adjusting a working state of a memory device, wherein the memory device is configured to be coupled to a host device and comprises a memory controller and a non-volatile memory, and the memory controller is coupled to the non-volatile memory and configured to control an operation of the memory device; the method comprises configuring the memory controller to perform the following steps:

setting a waiting time before the memory device enters a power-down mode as a first time value, wherein the memory device enters the power-down mode after the waiting time from being driven by a power-down instruction; and adjusting the waiting time before the memory device enters the power-down mode, comprising:

determining whether the host device is performing an access operation by detecting whether a read instruction or a write instruction is received from the host device, wherein when the read instruction or the write instruction is detected and at least one of the following conditions is satisfied, determining that the host device is performing the access operation:

if a volume of data read or written is greater than a first threshold after the read instruction or the write instruction is performed; or if a quantity of read instructions or write instructions continuously performed is greater than a second threshold after the read instruction or the write instruction is performed; and setting the waiting time as a second time value in response to the host device performing the access operation, wherein the first time value is smaller than the second time value.

2. The method according to claim 1, wherein the first time value is greater than or equal to 0 ms.

3. The method according to claim 1, wherein the second time value is greater than or equal to 20 ms.

4. The method according to claim 1, wherein the second threshold is at least two.

5. The method according to claim 1, wherein the first threshold is greater than or equal to 512 Kb.

6. A memory device, comprising:

a non-volatile memory, configured to store information; and a memory controller, coupled to the non-volatile memory and configured to control an operation of the memory device, wherein the memory controller comprises:

a processing circuit, configured to control the memory controller according to a plurality of host instructions from a host device to allow the host device to access the non-volatile memory through the memory controller; and a transmission interface circuit, configured to communicate with the host device to perform transmitting and receiving operations;

wherein the memory controller is configured to perform the following steps:

setting a waiting time before the memory device enters a power-down mode as a first time value, wherein the memory device enters the power-down mode after the waiting time from being driven by a power-down instruction; and adjusting the waiting time before the memory device enters the power-down mode, comprising:

determining whether the host device is performing an access operation by detecting whether a read instruction or a write instruction is received from the host device, wherein when the read instruction or the write instruction is detected and at least one of the following conditions is satisfied, determining that the host device is performing the access operation:

if a volume of data read or written is greater than a first threshold after the read instruction or the write instruction is performed; or if a quantity of read instructions or write instructions continuously performed is greater than a second threshold after the read instruction or the write instruction is performed; and setting the waiting time as a second time value in response to the host device performing the access operation, wherein the first time value is smaller than the second time value.

7. The memory device according to claim 6, wherein the first time value is greater than or equal to 0 ms.

8. The memory device according to claim 6, wherein the second time value is greater than or equal to 20 ms.

9. The memory device according to claim 6, wherein the second threshold is at least two.

10. The memory device according to claim 6, wherein the first threshold is greater than or equal to 512 Kb.

11. An electronic device, comprising the memory device according to claim 6, and further comprising: the host device, coupled to the memory device, wherein the host device comprises: at least one processor, configured to control an operation of the host device; a power supply circuit, coupled to the at least one processor and configured to provide a power source to the at least one processor and the memory device, wherein the memory device provides storage space to the host device.

12. The electronic device according to claim 11, wherein the first time value is greater than or equal to 0 ms, and the second time value is greater than or equal to 20 ms.

13. The electronic device according to claim 11, wherein the second threshold is at least two, and the first threshold is greater than or equal to 512 Kb.

14. A memory controller for a memory device, wherein the memory device comprises the memory controller and a non-volatile memory; the memory controller comprises: a processing circuit, configured to control the memory controller according to a plurality of host instructions from a host device to allow the host device to access the non-volatile memory through the memory controller; and a transmission interface circuit, configured to communicate with the host device; wherein the memory controller is configured to perform the following steps:

setting a waiting time before the memory device enters a power-down mode as a first time value, wherein the memory device enters the power-down mode after the waiting time from being driven by a power-down instruction, the waiting time starts when the host device presents an idle state; and adjusting the waiting time before the memory device enters the power-down mode, comprising:

determining whether the host device is performing an access operation by detecting whether a read instruction or a write instruction is received from the host device, wherein when the read instruction or the write instruction is detected and at least one of the following conditions is satisfied, the memory controller determines that the host device is performing the access operation:

if a volume of data read or written is greater than a first threshold after the read instruction or the write instruction is performed; or if a quantity of read instructions or write instructions continuously performed is greater than a second threshold after the read instruction or the write instruction is performed; and setting the waiting time as a second time value in response to the host device performing the access operation, wherein the first time value is smaller than the second time value.

15. The memory controller according to claim 14, wherein the first time value is greater than or equal to 0 ms, and the second time value is greater than or equal to 20 ms.

16. The memory controller according to claim 14, wherein the second threshold is at least two, and the first threshold is greater than or equal to 512 Kb.

* * * * *